United States Patent
Matsumoto

(10) Patent No.: US 8,489,133 B2
(45) Date of Patent: Jul. 16, 2013

(54) COMMUNICATION SYSTEM, TRANSMISSION DEVICE, RECEPTION DEVICE, AND SYNCHRONIZATION METHOD

(75) Inventor: Mariko Matsumoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 1221 days.

(21) Appl. No.: 12/304,113

(22) PCT Filed: Jun. 4, 2007

(86) PCT No.: PCT/JP2007/061297
§ 371 (c)(1),
(2), (4) Date: Dec. 9, 2008

(87) PCT Pub. No.: WO2007/142194
PCT Pub. Date: Dec. 13, 2007

(65) Prior Publication Data
US 2010/0178877 A1  Jul. 15, 2010

(30) Foreign Application Priority Data
Jun. 9, 2006 (JP) .................................. 2006-161058

(51) Int. Cl.
*H04J 11/00* (2006.01)
*H04L 5/14* (2006.01)
*H04B 3/10* (2006.01)
*H04B 7/00* (2006.01)
*H04B 1/00* (2006.01)

(52) U.S. Cl.
USPC ............. 455/502; 455/71; 455/450; 375/344; 370/208; 370/294; 370/491

(58) Field of Classification Search
USPC ............. 455/71, 502, 450; 375/344; 370/208, 370/294, 491
See application file for complete search history.

(56) References Cited

U.S. PATENT DOCUMENTS
6,324,290 B1 * 11/2001 Murakami et al. .............. 381/92
6,671,002 B1 * 12/2003 Konishi et al. ................ 348/725
(Continued)

FOREIGN PATENT DOCUMENTS
EP  1 445 907 A2  8/2004
JP  10-313285 A  11/1998
(Continued)

OTHER PUBLICATIONS
"SCH Structure and Cell Search Method for E-UTRA Downlink", NTT DoCoMo, NEC, Sharp, 3GPP TSG RAN WG1 Meeting #44, Feb. 13-17, 2006, p. 1-9, Denver, USA, (Original R1-060042).
(Continued)

*Primary Examiner* — Bobbak Safaipour
(74) *Attorney, Agent, or Firm* — Sughrue Mion, PLLC

(57) ABSTRACT

Receiver (2) sequentially switches a preset frequency change amount in stages from a large value to a small value. According to the reception side frequency change amount, the reception side frequency candidate for detecting a synchronization signal is calculated. Synchronization signal detection unit (5) detects a synchronization signal transmitted from a transmission device by using the calculated reception side frequency candidate. Moreover, transmitter (1) calculates a transmission side frequency candidate as a frequency candidate for transmitting the synchronization signal according to the largest possible frequency change amount calculated according to the bandwidth of the synchronization signal. When the calculated transmission side frequency candidate exists in the system frequency band, the calculated transmission side frequency candidate is determined to be a synchronization signal frequency for transmission of the synchronization signal, and the synchronization signal is transmitted from synchronization signal transmission unit (4) to receiver (2).

14 Claims, 24 Drawing Sheets

U.S. PATENT DOCUMENTS

| | | | |
|---|---|---|---|
| 7,327,811 B2 * | 2/2008 | Molnar | 375/344 |
| RE41,430 E * | 7/2010 | Kuroda et al. | 369/47.32 |
| 2004/0151145 A1 * | 8/2004 | Hammerschmidt | 370/338 |
| 2005/0063298 A1 * | 3/2005 | Ling et al. | 370/208 |
| 2005/0078774 A1 * | 4/2005 | Rick et al. | 375/344 |
| 2005/0141658 A1 * | 6/2005 | Tanaka et al. | 375/346 |
| 2006/0146690 A1 * | 7/2006 | Zhang et al. | 370/203 |
| 2010/0178877 A1 * | 7/2010 | Matsumoto | 455/71 |
| 2012/0122465 A1 * | 5/2012 | Landstrom et al. | 455/450 |

FOREIGN PATENT DOCUMENTS

| | | | |
|---|---|---|---|
| JP | 2000-13356 A | 1/2000 | |
| JP | 2000-151554 A | 5/2000 | |
| JP | 2003-244083 A | 8/2003 | |
| JP | 3549361 B2 | 4/2004 | |
| JP | 2005-525725 A | 8/2005 | |
| JP | 2006-129307 A | 5/2006 | |
| WO | 99/08427 A1 | 2/1999 | |
| WO | 03/063538 A1 | 7/2003 | |
| WO | 2004/021616 A1 | 3/2004 | |
| WO | 2005/022797 A2 | 3/2005 | |
| WO | 2005/101711 A1 | 10/2005 | |

OTHER PUBLICATIONS

"3RD Generation Partnership Project; Technical Specification Group Radio Access Network; Physical Layer Aspects for Evolved UTRA", (Release 7), 3GPP TR 25.814, Feb. 2006, p. 1-102, V1.1.1.

* cited by examiner

CANDIDATE FREQUENCY AT SECOND STAGE

CANDIDATE FREQUENCY AT THIRD STAGE

COMMUNICATION SYSTEM, TRANSMISSION DEVICE, RECEPTION DEVICE, AND SYNCHRONIZATION METHOD

TECHNICAL FIELD

The present invention relates to a communication system, a transmission device, a reception device, and a synchronization method for detecting an effective frequency for receiving information from among a plurality of candidate frequencies.

BACKGROUND ART

Conventionally, in a communication system which employs mobile stations such as portable terminals, a plurality of frequencies are defined as frequencies for downlink signals transmitted from a base station to a mobile station. Then, one or a plurality of frequencies is selected from among a plurality of these frequencies, and a downlink signal is transmitted using the selected frequency (frequencies).

FIG. 1 is a diagram schematically showing a frequency domain for describing a band search which is a conventional frequency domain search.

For example, in 3GPP (3rd Generation Partnership Project) which is a standard of W-CDMA (Wideband Code Division Multiple Access), 276 frequencies called raster are set at intervals of 200 kHz in a frequency domain from 2110 MHz to 2170 MHz except for 2.5 MHz at both ends, as shown in FIG. 1. Then, an effective frequency is selected from the set frequencies, and a downlink signal is transmitted using a transmission band centered at the selected effective frequency. In this regard, the raster is defined as a minimum unit for placing a center frequency within a transmission band of a system.

A mobile station, in turn, detects an effective frequency from among candidate frequencies upon power-on or upon detection of being out-of-range, and further establishes synchronization with a base station. Processing for detecting this effective frequency is called "band search processing." The detection of an effective frequency may involve using a known signal called a synchronization signal. As a method for speeding up this band search processing, a method has been proposed for grouping a plurality of adjacent frequencies into a block (for example, see JP-2003-244083-A).

Also, in 3GPP Release 7, consideration has been given to enabling a plurality of transmission bandwidths (1.25, 2.5, 5, 10, 15, 20 MHz) to be set from a narrow band to a wide band within a frequency band owned by an operator (for example, see 3GPP TR 25.814.V1.1.1 (2006-2) Physical Layer Aspects for Evolved UTRA (Release 7) Section 7.1.1).

Further, a proposal has been made with respect to such a system which can set a plurality of bandwidths to match center frequencies of a plurality of bandwidths, where the center frequencies are set to be integer multiples of a raster, and placing a synchronization signal (SCH) in a central band (for example, see 3GPP R1-060311 SCH Structure and Cell Search Method for E-UTRA Downlink).

On the other hand, in recent years, OFDM (Orthogonal Frequency Division Multiplexing)/OFDMA (Orthogonal Frequency Division Multiplexing Access), which excels in multipath resistance, tend to be employed in mobile communications, including 3GPP Release 7, 3GPP Long Term Evolution (LTE), and WiMAX as well. In this event, since parameters such as a sub-carrier interval are set taking into account to fading resistance, the sub-carrier interval can fail to be an integer multiple of a raster, resulting in difficulties in simplification of band search processing and synchronization processing.

However, the method described above implies a problem in which a long time is required for band searching processing to detect an effective frequency because the method sequentially searches a number of set candidate frequencies for the presence or absence of effective waves.

Also, a large amount of processing is required for sequentially searching a number of frequencies for the presence or absence of effective waves, and moreover, when OFDM is used as a transmission scheme, intermediate results and the like cannot be referenced to one another in the processing for each candidate frequency unless the sub-carrier interval is an integer multiple of the raster, giving rise to a problem of a failure to reduce the processing amount and a resulting increase in power consumption required for band search processing.

DISCLOSURE OF THE INVENTION

To solve the problems mentioned above, it is an object of the present invention to provide a communication system, a transmission device, a reception device, and a synchronization method which are capable of implementing effective frequency detection processing at higher speeds.

To achieve the above object, the present invention is characterized in that:

in a communication system comprising a transmission device for transmitting a synchronization signal for establishing synchronization, and a reception device for establishing synchronization by detecting the synchronization signal, the reception device sequentially changes intervals from long intervals to shorter intervals at which an attempt is made to detect the synchronization signal, and the transmission device is set to transmit the synchronization signal at long intervals of the reception device.

The communication system is also characterized in that:

the synchronization is frequency synchronization, and the establishment of synchronization includes detecting an effective communication frequency, the reception device sequentially switches a preset frequency change amount from a larger value to a smaller value in stages, calculates a reception side candidate frequency for detecting the synchronization signal based on the frequency change amount, and detects the synchronization signal using the calculated reception side candidate frequency, and the transmission device calculates a transmission side candidate frequency which is a candidate for a frequency for transmitting the synchronization signal, based on the largest possible frequency change amount calculated on the basis of a system bandwidth in which the communication system communicates, and said transmission device determines the transmission side candidate frequency as a synchronization signal frequency for transmitting the synchronization signal when the transmission side candidate frequency exists within the system frequency band.

The communication system is also characterized in that:

the reception device adds an offset to an integer multiple of the reception side frequency change amount to generate the reception side candidate frequency, and the transmission device adds an offset to an integer multiple of the transmission side frequency change amount to generate the transmission side candidate frequency.

The communication system is also characterized in that:

the reception device sets the offset to zero, and the transmission device sets the offset to zero.

The communication system is also characterized in that:
the transmission device transmits a known signal as the synchronization signal, and
the reception device detects matching the reception side candidate frequency with the known signal, or with a replica signal calculated from the known signal using IFFT or FFT, and stores the calculated replica signal.

The communication system is also characterized in that:
the transmission device transmits a signal which repeats the same pattern as the synchronization signal, and
the reception device detects the synchronization signal through a delay detection.

The communication system is also characterized in that the transmission device sets the transmission side frequency change amount to an integer multiple of a minimum placement unit of a center frequency of the system band.

The communication system is also characterized in that the reception device sets the reception side frequency change amount to an integer multiple of a minimum placement unit of a center frequency of the system band.

Also, a transmission device transmits a synchronization signal to a reception device for establishing synchronization within a system frequency band, wherein:
the transmission device calculates a transmission side candidate frequency which is a candidate for a frequency for transmitting the synchronization signal based on the largest possible transmission side frequency change amount calculated on the basis of a bandwidth of the synchronization signal, and determines the transmission side candidate frequency as a synchronization signal frequency for transmitting the synchronization signal when the transmission side candidate frequency exists within the system frequency band.

The transmission device is also characterized by adding an offset to an integer multiple of the transmission side frequency change amount to generate the transmission side candidate frequency.

The transmission device is also characterized by setting the offset to zero.

Also, a reception device receives a synchronization signal transmitted from a transmission device, wherein:
the reception device sequentially switches a preset reception side frequency change amount from a larger value to a smaller value in stages, calculates a reception side candidate frequency for detecting the synchronization signal based on the reception side frequency change amount, and detects the synchronization signal using the calculated reception side candidate frequency.

The reception device is also characterized by adding an offset to an integer multiple of the reception side frequency change amount to generate the reception side candidate frequency.

The reception device is also characterized by setting the offset to zero.

Also, a synchronization method in a communication system comprising a transmission device for transmitting a synchronization signal for establishing synchronization in a system frequency band, and a reception device for detecting the synchronization signal in the system frequency band, includes:
processing performed by the reception device to sequentially change intervals from long intervals to shorter intervals at which an attempt is made to detect the synchronization signal, and
processing performed by the transmission device to set a transmission such that the synchronization signal is detected at the long intervals of the reception device.

The synchronization method also includes:
processing performed by the reception device to sequentially switch a preset frequency change amount from a larger value to a smaller value in stages;
processing performed by the reception device to calculate a reception side candidate frequency for detecting the synchronization signal based on the reception side frequency change amount;
processing performed by the reception device to detect the synchronization signal using the calculated reception side candidate frequency;
processing performed by the transmission device to calculate a transmission side candidate frequency which is a candidate for a frequency for transmitting the synchronization signal, based on the largest possible frequency change amount calculated on the basis of a bandwidth of the synchronization signal;
processing performed by the transmission device to determine the transmission side candidate frequency as a synchronization signal frequency for transmitting the synchronization signal when the transmission side candidate frequency exists within the system frequency band; and
processing performed by the transmission device to transmit the synchronization signal to the reception device using the synchronization signal frequency.

Also, the reception side frequency change amount and the transmission side frequency change amount include the same value.

In the present invention configured as described above, the synchronization signal is transmitted from the transmission device for establishing synchronization within the system frequency band, and the reception device sequentially changes frequencies from extracted frequencies roughly to extracted frequencies not roughly at which an attempt is made to detect the synchronization signal, and detects the synchronization signal within the system frequency band.

In this way, it is possible to realize an increase in the speed of processing for detecting an effective frequency from a plurality of frequency candidates, and to realize a reduction in power consumption required for the processing.

As described above, in the present invention, the synchronization signal is transmitted from the transmission device for establishing synchronization within the system frequency band, and the reception device is configured to sequentially change frequencies from extracted frequencies roughly to extracted frequencies not roughly at to which an attempt is made to detect the synchronization signal, and to detect the synchronization signal within the system frequency band, while the transmission device sets a synchronization signal transmission frequency such that it is detected earlier by the reception device, thus making it possible to implement effective frequency detection processing at higher speeds.

BEST MODE FOR CARRYING OUT THE INVENTION

In the following, embodiments of the present invention will be described with reference to the drawings.

Figure 1:
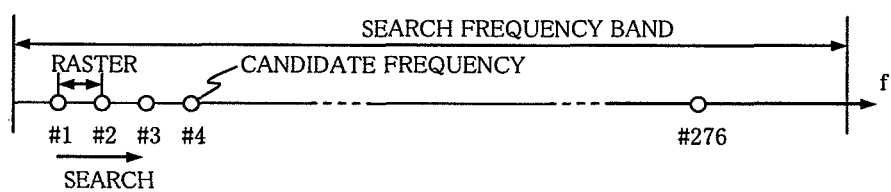
FIG. 1 A diagram schematically showing a frequency domain for describing a band search which is a conventional frequency domain search.
Figure 2:
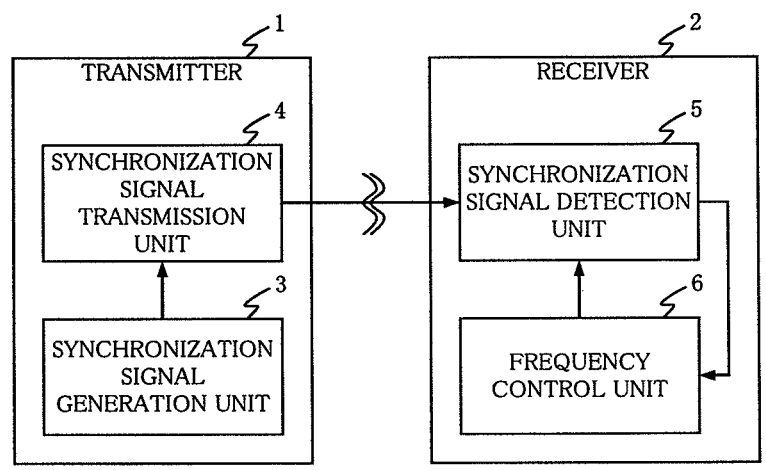
FIG. 2 A diagram showing one embodiment of a communication system according to the present invention.

FIG. 2 is a diagram showing one embodiment of a communication system according to the present invention.

As shown in FIG. 2, this embodiment comprises transmitter 1 which is a transmission device, receiver 2 which is a reception device for communicating with transmitter 1. Further, transmitter 1 comprises synchronization signal generation unit 3 and synchronization signal transmission unit 4. Receiver 2 in turn comprises synchronization signal detection unit 5 and frequency control unit 6. Synchronization signal generation unit 3 generates a synchronization signal for establishing synchronization between transmitter 1 and receiver 2. Synchronization signal transmission unit 4 transmits the synchronization signal generated by synchronization signal generation unit 3 to receiver 2. Frequency control unit 6 applies synchronization signal detection unit 5 with a frequency for detecting the synchronization signal transmitted from transmitter 1. Synchronization signal detection unit 5 detects the synchronization signal using the frequency applied from frequency control unit 6, and notifies frequency control unit 6 of the detection result.

Figure 3:
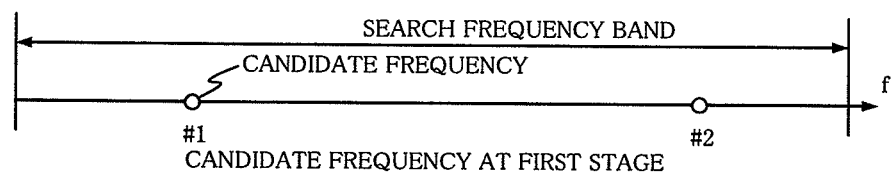
FIG. 3(a) A diagram schematically showing a frequency domain in the first stage for describing a stepwise synchronization channel search in the embodiment shown in FIG. 2.
FIG. 3(b) A diagram schematically showing a frequency domain in the second stage for describing a stepwise synchronization channel search in the embodiment shown in FIG. 2.
FIG. 3(c) A diagram schematically showing a frequency domain in the third stage for describing a stepwise synchronization channel search in the embodiment shown in FIG. 2.
Figure 3:
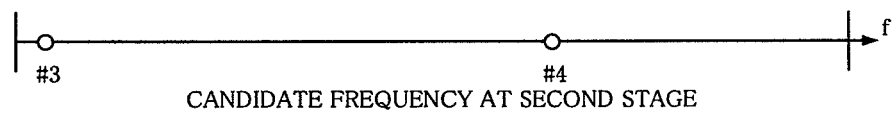
Figure 3:
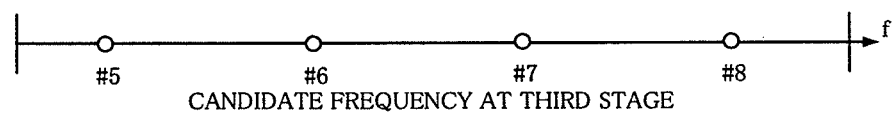

FIG. 3 is a diagram schematically showing a frequency domain for describing a stepwise synchronization channel search in the embodiment shown in FIG. 2.

As shown in FIG. 3, frequency control unit 6 of receiver 2 sequentially outputs candidate frequencies for detecting a synchronization signal at stages while changing from extracted frequencies roughly to extracted frequencies not roughly within a predefined frequency band.

In FIG. 3, (a) indicates a candidate frequency search which is attempted at the first stage of synchronization detection; (b) a candidate frequency search in the second Stage; and (c) a candidate frequency search in the third stage. The interval between frequencies becomes smaller as the stage advances.

In transmitter 1, the transmission frequency for synchronization signal transmission unit 4 is set such that the synchronization signal is carried on a frequency output by frequency control unit 6 of receiver 2 at an earlier stage.

Figure 4:
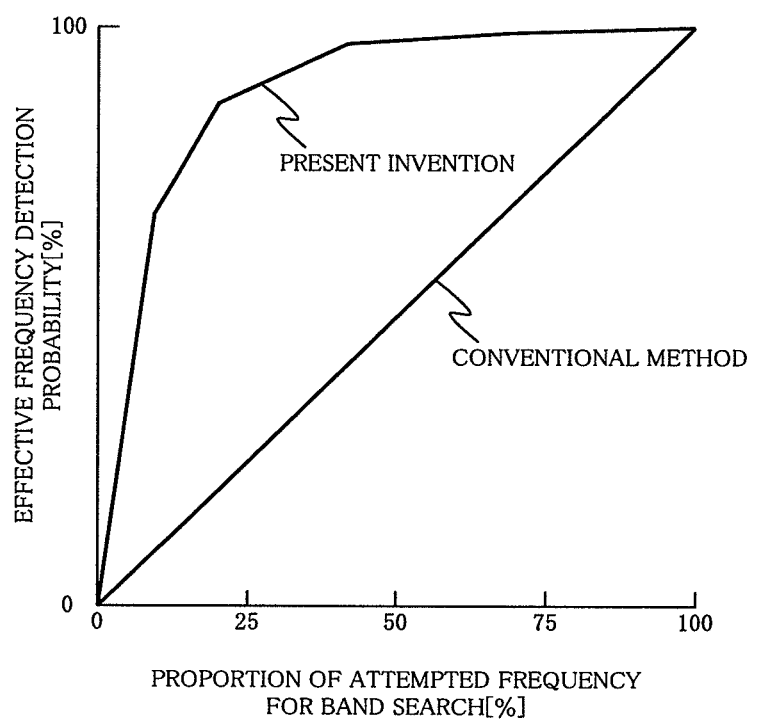
FIG. 4 A diagram showing effects resulting from a faster band search of the present invention.

FIG. 4 is a diagram showing effects of a faster band search according to the present invention.

As shown in FIG. 4, as compared with conventional methods, processing in the present invention described above can achieve a high detection probability at an earlier stage in the band search attempt.

Also, the synchronization signal generated by synchronization signal generation unit 3 of transmitter 1 may be a signal which repeats the same pattern on the time axis or a known signal between transmission and reception. Also, synchronization signal detection unit 5 of receiver 2 detects the synchronization signal through delay detection when the synchronization signal repeats the same pattern on the time axis, and attempts detection through synchronous detection when the synchronization signal has a known pattern. Also, the synchronization signal and the configuration of the detection unit do not limit the effects of the present invention, and may be implemented by any method.

Also, as described in JP-2003-244083-A, a search frequency band may be divided into a plurality of blocks to perform a power search, and band search processing may be performed only in a power detected band in accordance with the method of the present invention.

In the following, a description will be given of a synchronization method in the communication system shown in FIG. 2.

Figure 5:
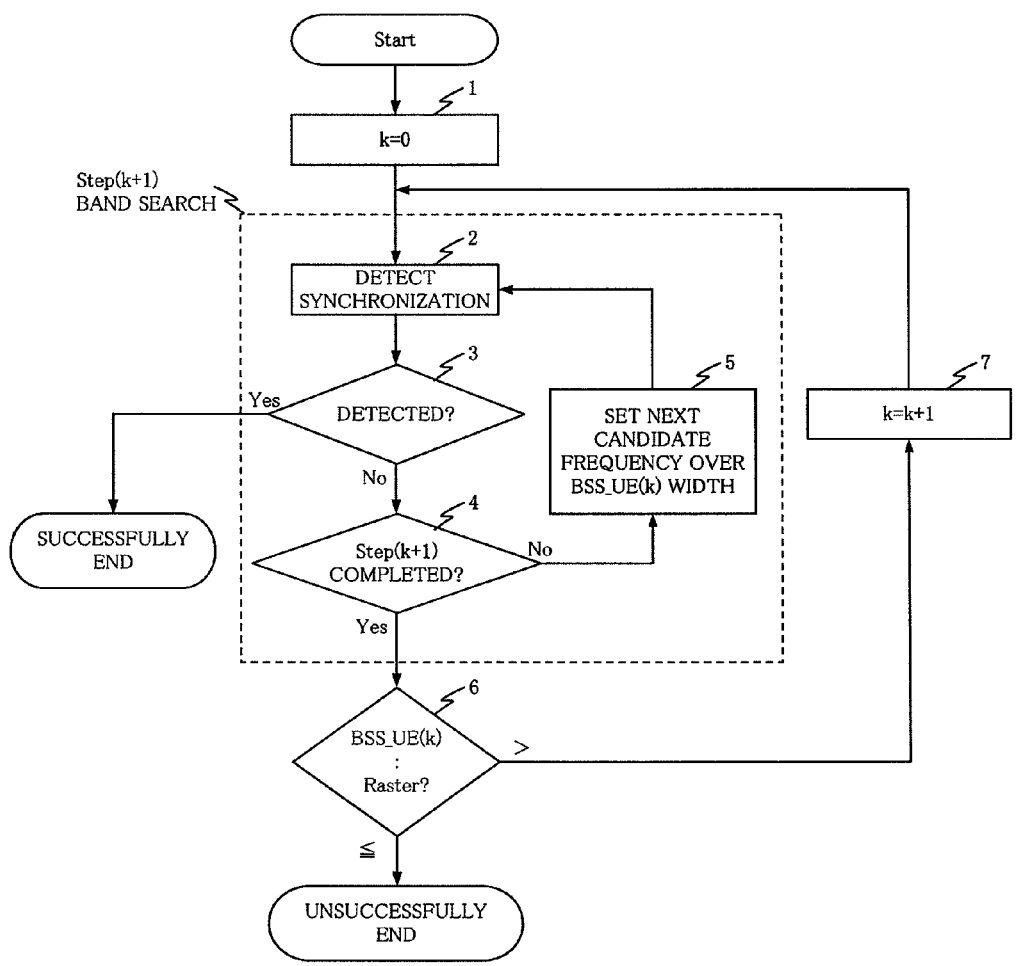
FIG. 5 A flow chart for describing a synchronization method in a receiver of the communication system shown in FIG. 2.

FIG. 5 is a flow chart for describing the synchronization method in receiver 2 of the communication system shown in FIG. 2.

Here, BSS_UE(k) designates a reception side frequency change amount (band search step) at a k-th search step and is defined as shown in Table 1.

TABLE 1

| k | 0 | 1 | 2 | 3 | 4 |
|---|---|---|---|---|---|
| BSS_UE(k) | 3.2 MHz | 1.6 MHz | 800 kHz | 400 kHz | 200 kHz |

First, at step 1, variable k is set to zero which is an initial value, and a synchronous detection is performed at step 2 for an effective frequency which is a reception side candidate frequency using a band search over BSS_UE(0) width. It is determined at step 3 whether or not an effective frequency is detected, and the processing ends when it is detected.

On the other hand, when no effective frequency is detected, it is determined at step 4 whether or not a next reception side candidate frequency exists through a band search over BSS_UE(0) width. That is, described in detail using a simple example, when a search frequency band is from 2000 MHz to 2005 MHz in which a synchronous detection is made for an effective frequency, assuming that the first candidate frequency found through synchronous detection is 2003.2 MHz, the next candidate frequency is 2006.4 MHz, because BSS_UE(0) width is 3.2 MHz, and thus exceeds the frequency band, this results in absence of the next candidate frequency. In this regard, the example given herein uses set values for convenience of description, which are not values that are actually used.

When it is determined at step 4 that the next candidate frequency exists through the band search over BSS_UE(0) width, the next candidate frequency is set at step 5, and synchronous detection at step 2 is performed.

On the other hand, when it is determined at step 4 that the next candidate frequency does not exist through the band search over BSS_UE(0) band, i.e., when it is determined that effective frequency search processing has ended through a band search over BSS_UE(0) band, the value of BSS_UE(0) is compared with the value of the raster at step 6. Assume herein that the value of the raster is 200 kHz. The value of BSS_UE(0) in turn is an integer multiple of the value of the raster.

Since the value of BSS_UE(0) is larger than the value of the raster, k=k+1 is set at step 7, and processing is performed for BSS_UE(1) at the next stage from step 2 in a manner similar to the processing in BSS_UE(0).

Unless an effective frequency is detected in any BSS_UE (k), processing at steps 2-7 is performed until the Value of BSS_UE(k) decreases to the value of the raster or less. As described in FIG. 3, synchronous detection is performed while the reception side frequency change amount is sequentially switched in stages from a larger value to a smaller value, i.e., candidate frequencies are sequentially changed in stages from extracted frequencies roughly to extracted frequencies not roughly within a predefined frequency band. When no effective frequency is detected even when the value BSS_UE (k) becomes equal to or less than the value of the raster, it is determined that no effective frequency exists within the search band.

Figure 6:
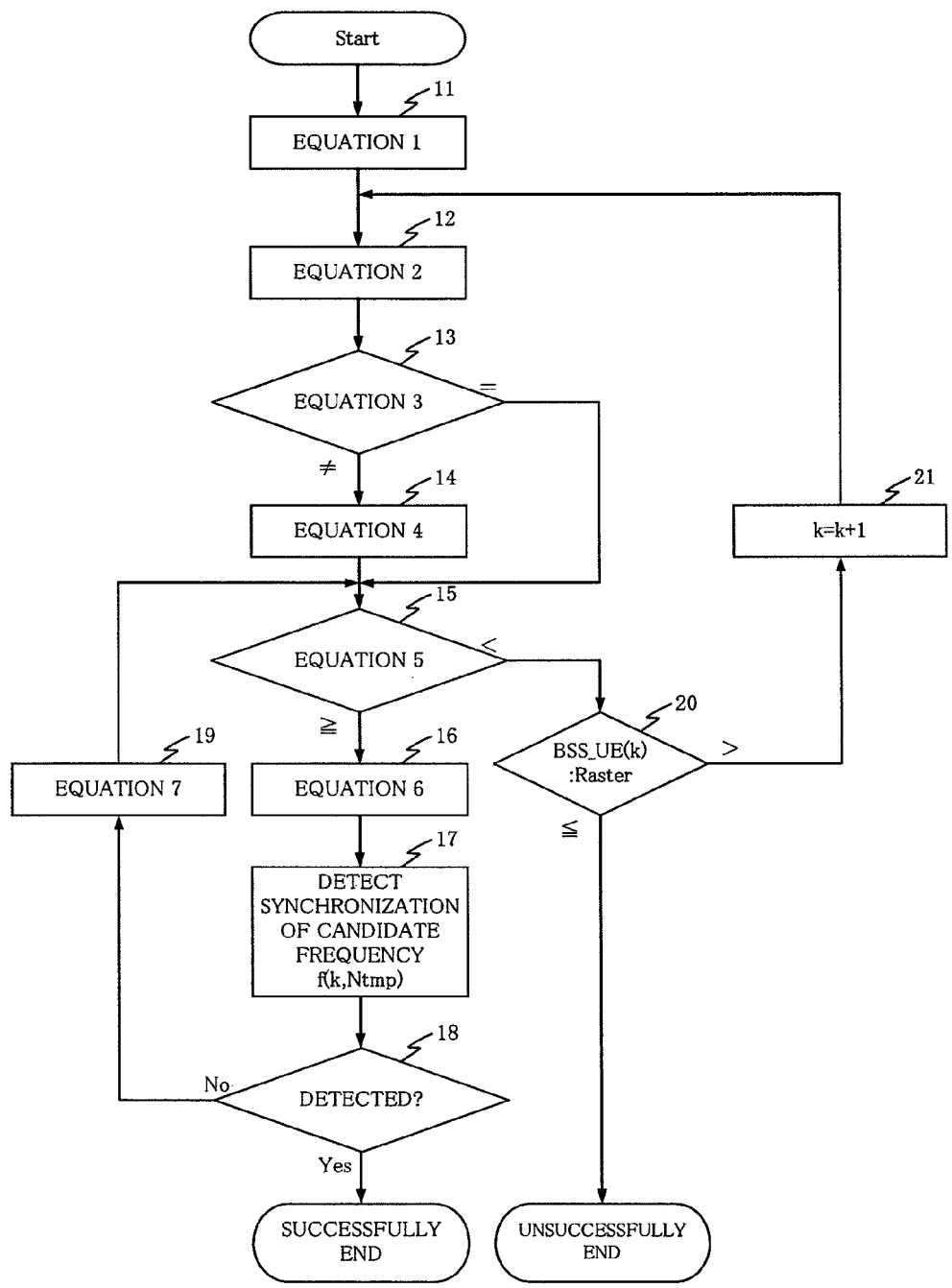
FIG. 6 A flow chart for more specifically showing the flow chart shown in FIG. 5.

FIG. 6 is a flow chart for more specifically showing the flow chart shown in FIG. 5.

Assume herein that the bandwidth of the synchronization signal is designated by SCH_BW. Assume also, that a search frequency band for detecting an effective frequency is defined by lower limit frequency f_L and upper limit frequency f_H.

First, as expressed by Equation 1, variable k is set to zero which is an initial value at step 11, and synchronous detection is started from maximum band search step BSS_UE(0).

[Expression 1]

$$k=0 \qquad \text{(EQUATION 1)}$$

At step 12, Ntmp is calculated using Equation 2. Assume herein that [ ] is such that a value within [ ] is rounded off to the right of the decimal point.

[Expression 2]

$$N_{tmp}=[(f\_L+SCH\_BW/2)/BSS\_UE(k)] \qquad \text{(EQUATION 2)}$$

Then, at step 13, (f_L+SCH_BW/2) is compared with (Ntmp×BSS_UE(k)) by Equation 3.

[Expression 3]

$$f\_L+SCH\_BW/2:N_{tmp}\times BSS\_UE(k) \qquad \text{(EQUATION 3)}$$

When it is determined at step 13 that (f_L+SCH_BW/2) is not equal to (Ntmp×BSS_UE(k)), the calculation of Equation 4 is performed at step 14.

[Expression 4]

$$N_{tmp}=N_{tmp}+1 \qquad \text{(EQUATION 4)}$$

Here, if a fractional value exists within [ ] of Equation 2 as a result of the calculations of Equation 2, Equation 3, and Equation 4, a round-up operation is performed.

Then, (f_H-SCH_BW/2) is compared with (Ntmp× BSS_UE(k) in Equation 5, and it is determined at step 15 whether or not a candidate frequency subjected to a band search has not more than a value having a margin of SCH_BW/2 for f_H.

[Expression 5]

$$f\_H-SCH\_BW/2:N_{tmp}\times BSS\_UE(k) \qquad \text{(EQUATION 5)}$$

On the other hand, when it is determined at step 13 that (f_L+SCH_BW/2) is equal to (Ntmp×BSS_UE(k), processing at step 15 is performed, while skipping processing at step 14.

When it is determined at step 15 that (Ntmp×BSS_UE(k) is equal to or less than (f_H−SCH_BW/2), candidate frequency f(k, Ntmp) is calculated at step 16 in accordance with Equation 6,

[Expression 6]

$$f(k,N_{tmp})=BSS\_UE(k)\times N_{tmp} \qquad \text{(EQUATION 6)}$$

Then, a synchronous detection is performed at step 17 for candidate frequency f(k, Ntmp) calculated in accordance with Equation 6, it is determined at step 18 whether or not synchronization is detected, and band search processing ends when synchronization is detected.

On the other hand, when synchronization is not detected at step 18, the value of Ntmp is incremented by one at step 19 in accordance with Equation 7, and processing at step 15 is again performed.

[Expression 7]

$$N_{tmp} = N_{tmp} + 1 \qquad \text{(EQUATION 7)}$$

On the other hand, when it is determined at step 15 that (Ntmp×BSS_UE(k)) has a value larger than (f_H−SCH_BW/2), k is incremented by one at step 21 until it is determined at step 20 that k exceeds a maximum value (four in this example) to execute band search processing, in a manner similar to processing at step 6 and step 7 which have been previously described in FIG. 5.

When synchronization is not detected even if k exceeds the maximum value, it is determined that no effective frequency exists within the search band.

Figure 7:
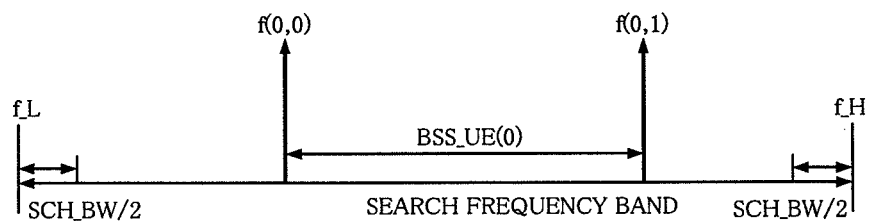
FIG. 7(a) A diagram schematizing processing in the first stage in stepwise band search processing described using the flow chart shown in FIG. 6.
FIG. 7(b) A diagram schematizing processing in the second stage in stepwise band search processing described using the flow chart shown in FIG. 6.
FIG. 7(c) A diagram schematizing processing in the third stage in stepwise band search processing described using the flow chart shown in FIG. 6.
FIG. 7(d) A diagram schematizing processing in the fifth stage in stepwise band search processing described using the flow chart shown in FIG. 6.
Figure 7:
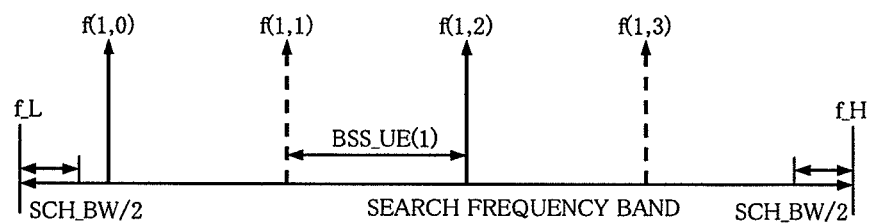
Figure 7:
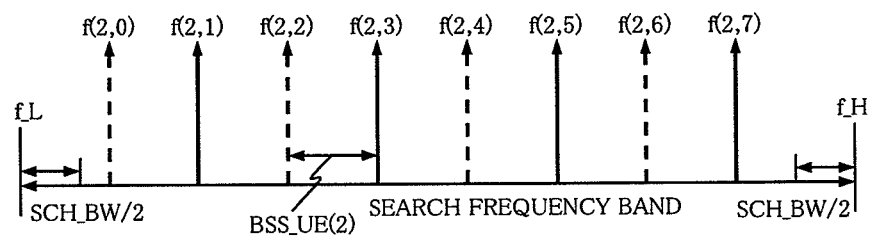
Figure 7:
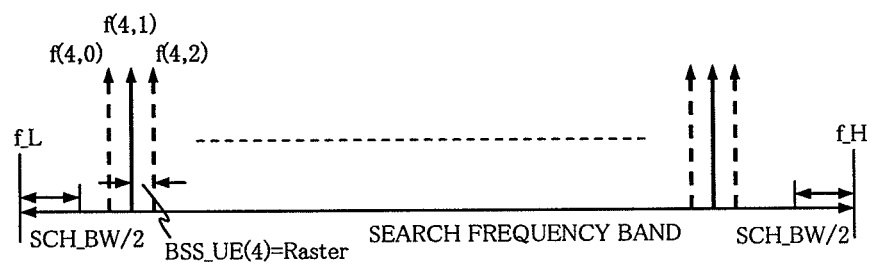

FIG. 7 is a diagram which schematizes the stepwise band search processing which has been described with reference to the flow chart shown in FIG. 6.

FIG. 7(*a*) shows candidate frequencies which are subjected to synchronous detection at the first stage of the stepwise band search. At the first stage, synchronous detection is made for candidate frequencies f(0,0) and f(0,1) which exist within a range that has a margin of SCH_BW/2 at each upper limit and at each lower limit of search frequency band (f_L-f_H). In this event, the difference between f(0,1) and f(0,0) is BSS_UE (0).

FIG. 7(*b*) shows candidate frequencies which are subjected to synchronous detection at the second stage of the stepwise band search. At the second stage, there are four candidate frequencies f(1,0)-f(1,3) which are separated by BSS_UE(1) from one another within the search frequency band, but f(1,1) and f(1,3) indicated by broken arrows have not been detected after the synchronous detection attempted at the first stage, so that they are not again subjected to synchronous detection processing.

Likewise, FIG. 7(*c*) shows candidate frequencies which are subjected to a synchronous detection at the third stage of the stepwise band search. At the third stage, there are eight candidate frequencies f(2,0)-f(2,7) which are separated by BSS_UE(2) from one another within the search frequency band, but f(2,0), f(2,2), f(2,4), f(2,6) indicated by broken arrows have not been detected after the synchronous detections attempted at the first stage and second stage, so that they are not again subjected to the synchronous detection processing.

Likewise, FIG. 7(*d*) shows candidate frequencies which are subjected to synchronous detection at the fifth stage of the stepwise band search. In this event, since BSS_UE(4) is equal to Raster, the band search can be fully carried out with the accuracy of raster in a manner similar to before.

Figure 8:
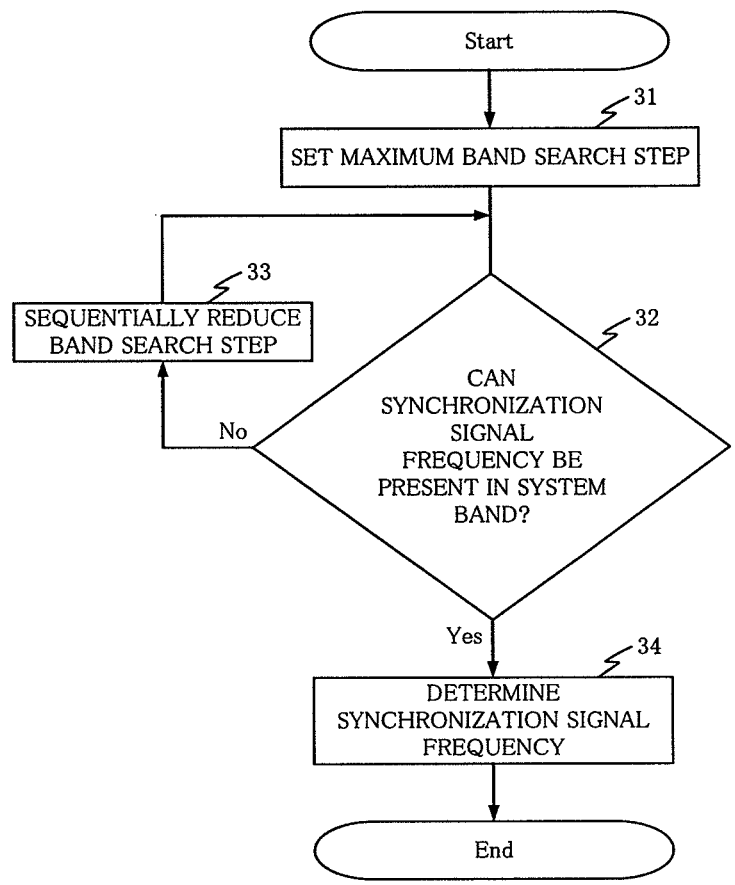
FIG. 8 A flow chart for describing a procedure for determining a transmission frequency for a synchronization signal in a transmitter of the communication system shown in FIG. 2.

FIG. 8 is a flow chart for describing a procedure for determining a transmission frequency for the synchronization signal in transmitter 1 of the communication system shown in FIG. 2.

Assume that receiver 2 determines a frequency at which an attempt is made to detect the synchronization signal while changing the step size at stages when the band search is made. On the other hand, transmitter 1 determines frequency fp_s1 at which the synchronization signal is transmitted within a plurality of band search steps such that a band search step is maximized while ensuring a band (SCH_BW) for the synchronization signal within the system transmission band (fL_s1-fH_s1).

First, a maximum band search step is set at step 31 to result in a state in which frequencies are most roughly extracted. A synchronization signal frequency for inserting the synchronization signal is calculated as a transmission side candidate frequency by a predetermined equation using the set band search step. It is determined at step 32 whether or not the synchronization signal can be transmitted at the calculated transmission side candidate frequency, i.e., whether or not the transmission side candidate frequency exists within the system frequency band.

When it is determined that the candidate frequency cannot be transmitted, the band search step is sequentially set to a smaller value in stages at step 33 to change to extracted one not roughly. A transmission side candidate frequency is again calculated using the changed band search step. It is determined whether or not the synchronization signal can be transmitted at the calculated transmission side candidate frequency, and the transmission side candidate frequency is determined as a synchronization signal frequency at step 34 when it is determined that the candidate frequency can be transmitted.

Figure 9:
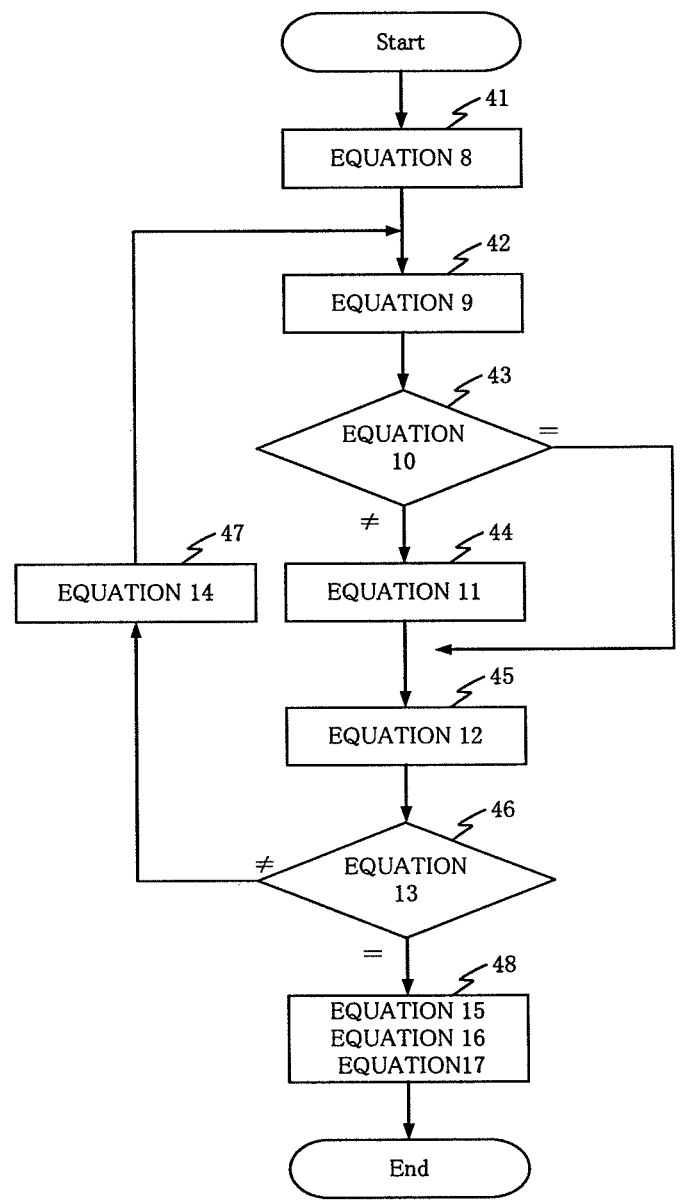
FIG. 9 A flow chart for describing another determining method for a procedure for determining a transmission frequency for a synchronization signal in a transmitter of the communication system shown in FIG. 2.

FIG. 9 is a flow chart for describing another determining method for the procedure of determining a transmission frequency for the synchronization signal in transmitter 1 of the communication system shown in FIG. 2.

Here, BSS_tmp is defined to be a variable for finding maximum band search step BSS_s1 which is a maximum transmission side frequency change amount.

First, a minimum value is set for the band search step. Specifically, value Raster of the raster is set as an initial value for the band search step at step 41, as expressed by Equation 8.

[Expression 8]

$$BSS\_tmp = \text{Raster} \qquad \text{(EQUATION 8)}$$

In this event, when the raster has not been defined, a preset minimum value is set for the band search step.

Then, at step 42, NL_tmp is calculated using Equation 9. Assume herein that [ ] is such that a value within [ ] is rounded off to the right of the decimal point.

[Expression 9]

$$N_{L\_tmp} = [(f_{L\_s1} + SCH\_BW/2)/BSS\_tmp] \qquad \text{(EQUATION 9)}$$

Then, at step 43, (fL_s1) is compared with (NL_tmp× BSS_tmp) in Equation 10.

[Expression 10]

$$f_{L\_s1} : N_{L\_tmp} \times BSS\_tmp \qquad \text{(EQUATION 10)}$$

When it is determined at step 43 that (fL_s1) is not equal to (NL_tmp×BSS_tmp), the calculation of Equation 11 is performed at step 44.

[Expression 11]

$$N_{L\_tmp} = N_{L\_tmp} + 1 \qquad \text{(EQUATION 11)}$$

Here, if a fractional value exists in the division within [ ] of Equation 9 as a result of the calculations of Equation 9, Equation 10 and Equation 11, a round-up operation is performed.

Then, variable NH_tmp is calculated in accordance with Equation 12 at step 45. Also, when it is determined at step 43 that fL_s1 is equal to (NL_temp×BBS_temp), processing at step 45 is performed, while skipping processing at step 44.

[Expression 12]

$$N_{H\_tmp}=[(f_{H\_s1}+SCH\_BW/2)/BSS\_tmp]$$ (EQUATION 12)

Subsequently, NL_temp is compared with NH_temp by Equation 13 at step 46.

[Expression 13]

$$N_{L\_tmp}:N_{H\_tmp}$$ (EQUATION 13)

When it is determined that NL_temp is not equal to NH_temp, the value of band search step BSS is calculated to be a large value in accordance with Equation 14 at step 47 because BSS_tmp has not reached a maximum value. Then, processing at steps 42-45 is performed again.

[Expression 14]

$$BSS\_tmp=BSS\_tmp\times2$$ (EQUATION 14)

On the other hand, when it is determined that NL_temp is equal to NH_temp, frequency fp_s1 at which the synchronization signal is transmitted is determined in accordance with Equation 15, Equation 16 and Equation 17 at step 48 because BSS_temp has reached the maximum value.

[Expression 15]

$$N_{s1}=N_{L\_tmp}$$ (EQUATION 15)

[Expression 16]

$$BSS\_s1=BSS\_tmp$$ (EQUATION 16)

[Expression 17]

$$f_{p\_s1}=N_{s1}\times BSS\_s1$$ (EQUATION 17)

In this way, a frequency at which the synchronization signal is transmitted on the transmission side can be determined irrespective of whether the band search step is changed from a larger value to a smaller value or changed from a smaller value to a larger value.

Figure 10:
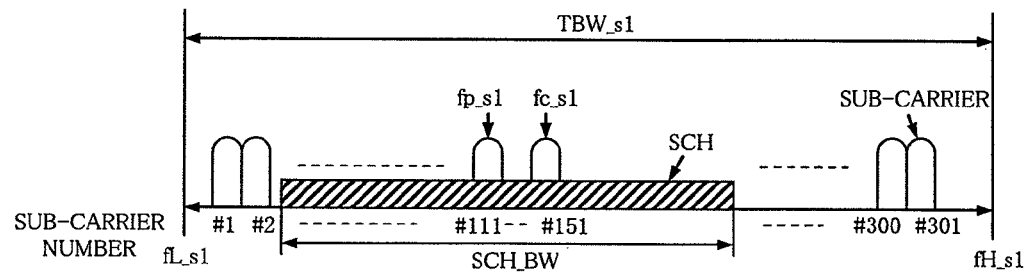
FIG. 10(a) A diagram schematically showing the placement of a synchronization signal in a frequency domain in the present invention in a system having a transmission band of TBW_s1=5 MHz for transmitting an OFDM signal comprised of 301 sub-carriers.
FIG. 10(b) A diagram schematically showing the placement of a synchronization signal in a frequency domain in the present invention in a system having a transmission band of TBW_s2=1.25 MHz for transmitting an OFDM signal comprised of 705 sub-carriers.
Figure 10:
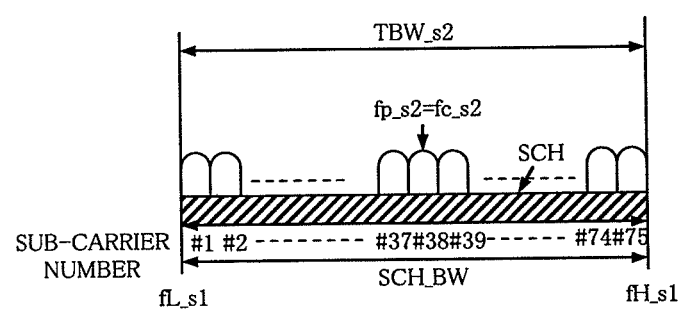

FIG. 10 is a diagram schematically showing the placement of the synchronization signal in a frequency domain in the present invention. Here, an OFDM signal is assumed.

In FIG. 10(a), assume that a system has transmission band TBW_s1 of 5 MHz for transmitting an OFDM signal comprised of 301 sub-carriers. Also, fc_s1 is the center frequency of system s1. Assume also that band SCH_BW of synchronization signal SCH is set to 1.25 MHz, and center frequency fp_s1 of the synchronization signal can be set independently of center frequency fc_s1 of the system.

In this event, since TBW_s1 is larger than SCH_BW, large BSS_s1 can be selected in the processing which has been described with reference to the flow chart of FIG. 8 or FIG. 9 if the raster has a sufficiently small value.

In the following, a description will be made with specific values given as an example.

As a specific example, assume that fL_s1=2130.9 MHz, fc_s1=2133.4 MHz, fH_s1=2135.9 MHz, Raster=200 kHz, the maximum value of a band search step is 6.4 MHz, and sub-carrier interval Δf=15 kHz. Here, a description will be given in accordance with the flow chart shown in FIG. 8, where the value of band search step is sequentially reduced from the maximum value of the band search step.

First, it is determined whether or not a synchronization signal frequency, which is an integer multiple of band search step of 6.4 MHz, exists at maximum band search step of 6.4 MHz in a transmission band between 2131.525 MHz and 2135.275 MHz which includes a margin of SCH_BW within the band. Here, there is no synchronization signal whose frequency is an integer multiple of band search step of 6.4 MHz.

Thus, the band search step is set to 3.2 MHz at the next stage, and it is determined whether or not a synchronization signal whose frequency is an integer multiple of the band search step of 3.2 MHz exists in the band between 2131.525 MHz and 2135.275 MHz. In this event, 2134.4 MHz exists as a candidate.

However, the difference between 2134.4 MHz and fc_s1 is 1 MHz which cannot be divided by 15 kHz, which is Δf, without a remainder. Since this means that this frequency is not a sub-carrier frequency, a sub-carrier for carrying the synchronization signal thereon does not match a sub-carrier frequency of the system, resulting in a determination that setting to fp_s1 is inappropriate. Accordingly, the band search step is further reduced to 1.6 MHz at the next step. Two candidates 2132.8 MHz and 2134.4 MHz exist in the band between 2131.525 MHz and 2135.275 MHz for a synchronization signal frequency which is an integer multiple of the band search step of 1.6 MHz.

Here, the difference between 2132.8 MHz and fc_s1 is 600 kHz which can be divided by Δf, so that it is determined that a sub-carrier for carrying the synchronization signal thereon matches the sub-carrier frequency of the system, resulting in fp_s1=2132.8 MHz. In this event, fp_s1 has a sub-carrier number of 111.

Next, assume in FIG. 10(b) that a system has transmission band TBW_s2 of 1.25 MHz, and transmits an OFDM signal comprised of 75 sub-carriers. Also, fc_s2 is the center frequency of system s2. Assume also that band SCH_BW of synchronization signal SCH is set to 1.25 MHz.

For example, in the processing which has been described with reference to the flow chart shown in FIG. 9, since TBW_s2=SCH_BW, BSS_s2=Raster is established, leading to fp_s2=fc_s2.

In the foregoing description, the frequency of the synchronization signal is an integer multiple of the band search step in Equation 6 and Equation 17, but an offset may be added to an integer multiple of the band search step to define Equation 18 and Equation 19.

[Expression 18]

$$f_{p\_s1\_offset}=f_{offset}+N_{s1\_offset}\times BSS\_s1\_\text{offset}$$ (EQUATION 18)

[Expression 19]

$$f_{offset}(k,N_{tmp})=f_{offset}+BSS\_UK(k)\times N_{tmp}$$ (EQUATION 19)

Together with Equation 18 and Equation 19, Equation 20 is substituted for Equation 2; Equation 21 for Equation 3; Equation 22 for Equation 5; and Equation 19 for Equation 6 in the processing which has been described with reference to the flow chart shown in FIG. 6.

[Expression 20]

$$N_{tmp}=[(f\_L-f_{offset}+SCH\_BW/2)/BSS\_UK(k)]$$ (EQUATION 20)

[Expression 21]

$$f\_L-f_{offset}+SCH\_BW/2:N_{tmp}\times BSS\_UK(k)$$ (EQUATION 21)

[Expression 22]

$$f\_H - f_{offset} - SCH\_BW/2 : N_{tmp} \times BSS\_UK(k) \quad \text{(EQUATION 22)}$$

Figure 11:
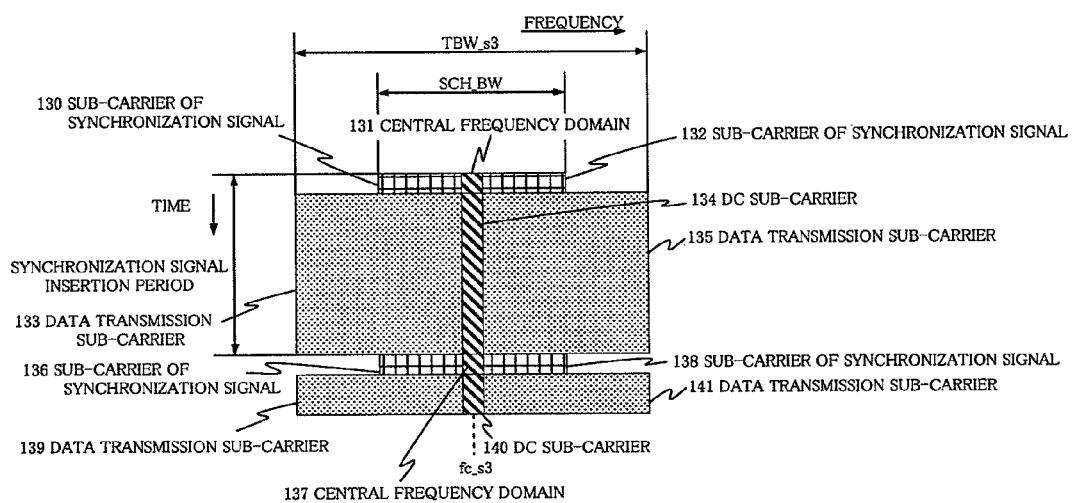
FIG. 11 A diagram schematizing a time domain and a frequency domain of general sub-carriers in 3GPP LTE.

FIG. 11 is a diagram which schematizes a time domain and a frequency domain of general sub-carriers in 3GPP LTE.

As shown in FIG. 11, in 3PGG LTE, a sub-carrier at a center frequency of a system band defines a sub-carrier different from a normal sub-carrier, called a "DC sub-carrier," for a simplified configuration for DC (Direct Current) component cut in a receiver. No data is transmitted at the defined sub-carrier. System s3 comprises normal data transmission sub-carriers 133, 135, 139, 141, and DC sub-carriers 134, 140 at center frequency fc_s3 of system band TBW_s3, on which no data is transmitted. Also, sub-carriers 130, 132, 136, 138 for the synchronization signal in band SCH_BW are inserted at a predetermined synchronization signal insertion period, and their central frequency domains 131, 137 are regions in which the synchronization signal is not transmitted.

Figure 12:
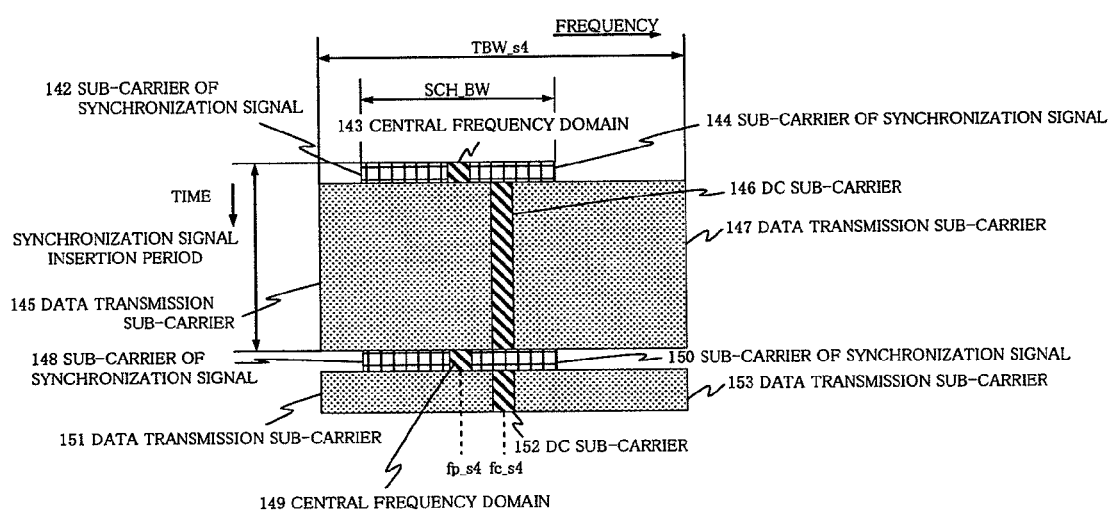
FIG. 12 A diagram schematizing a time domain and a frequency domain of sub-carriers in the present invention.

FIG. 12 is a diagram which schematizes a time domain and a frequency domain of sub-carriers in the present invention.

As shown in FIG. 12, system s4 comprises normal data transmission sub-carriers 145, 147, 151, 153, and DC sub-carriers 146, 152 at center frequency fc_s4 of system band TBW_s4, on which no data is transmitted. Also, sub-carriers 142, 144, 148, 150 for the synchronization signal, which is offset from center frequency fc_s4 are inserted at a predetermined synchronization signal insertion period, and the synchronization signal is not transmitted on sub-carriers in central frequency domains 143, 149 centered at center frequency fp_s4, as is the case with DC sub-carriers 146, 152.

Also, in a relationship between the sub-carrier interval and receiver, in a system which is not required to provide DC sub-carriers, a configuration for excluding data at center frequency fc of the system can be implemented by setting center frequency fc at a frequency between sub-carriers.

Figure 13:
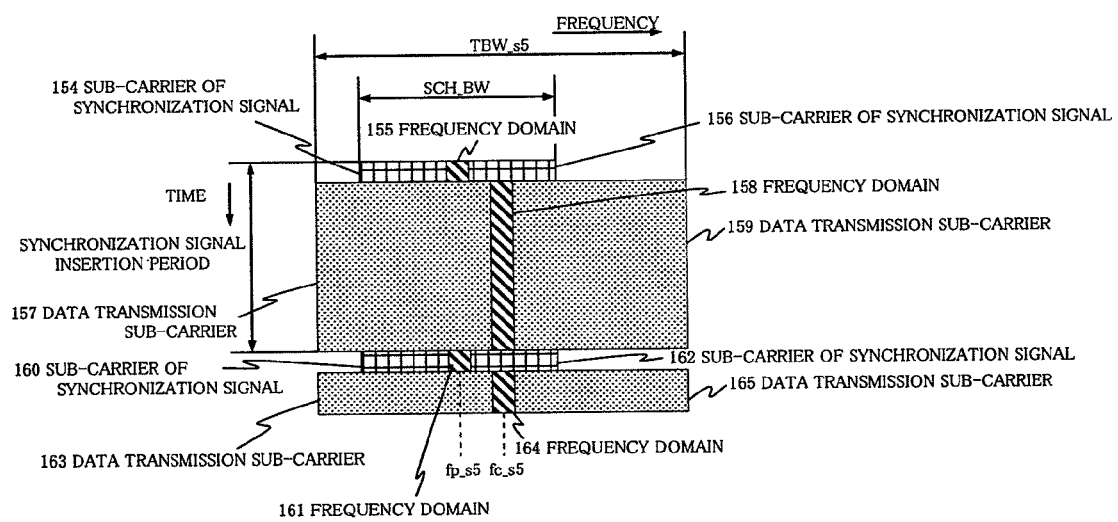
FIG. 13 A diagram schematizing a time domain and a frequency domain of sub-carriers in a system which is not required to provide DC sub-carriers.

FIG. 13 is a diagram which schematizes a time domain and a frequency domain of sub-carriers in a system which is not required to provide DC sub-carriers.

As shown in FIG. 13, system s5 comprises normal data transmission sub-carriers 157, 159, 163, 165, where center frequency fc_s5 of system band TBW_s5 extends through frequency domains 158, 164 between data transmission sub-carriers 157, 163 and data communication sub-carriers 159, 165. Also, sub-carriers 154, 156, 160, 162 for the synchronization signal, offset from center-frequency fc_s5 are inserted at a predetermined synchronization signal insertion period, and its center frequency fp_s5 extends through frequency domains 155, 161 between sub-carriers 154, 160 for the synchronization signal and sub-carriers 156, 162 for the synchronization signal, respectively.

Figure 14:
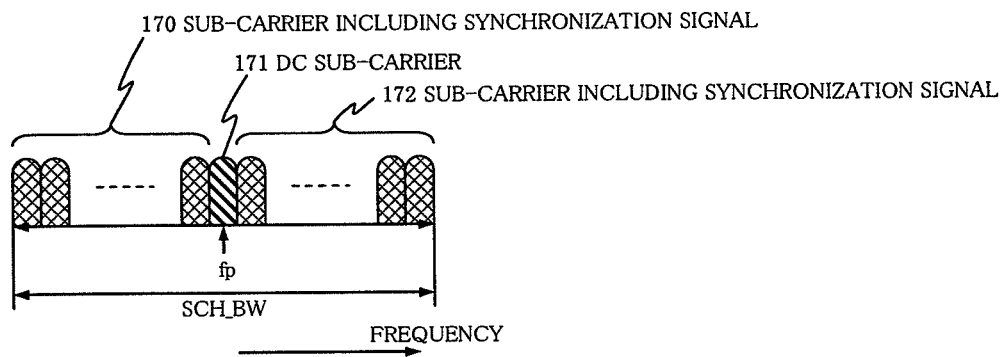
FIG. 14 A diagram schematizing sub-carriers on a frequency axis during transmission of a synchronization signal in a system which is provided with a DC sub-carrier.

FIG. 14 is a diagram which schematizes sub-carriers on the frequency axis during transmission of a synchronization signal in a system which is provided with a DC sub-carrier.

As shown in FIG. 14, the synchronization signal is comprised of sub-carriers 170, 172 including the synchronization signal, and DC sub-carrier 171. DC sub-carrier 171 is placed at center frequency fp of the synchronization signal, and does not include the synchronization signal.

Also, in a system which is not required to provide a DC sub-carrier, a configuration for excluding the synchronization signal at center frequency fp of the synchronization signal can be implemented by setting fp at a frequency between sub-carriers which include the synchronization signal.

Figure 15:
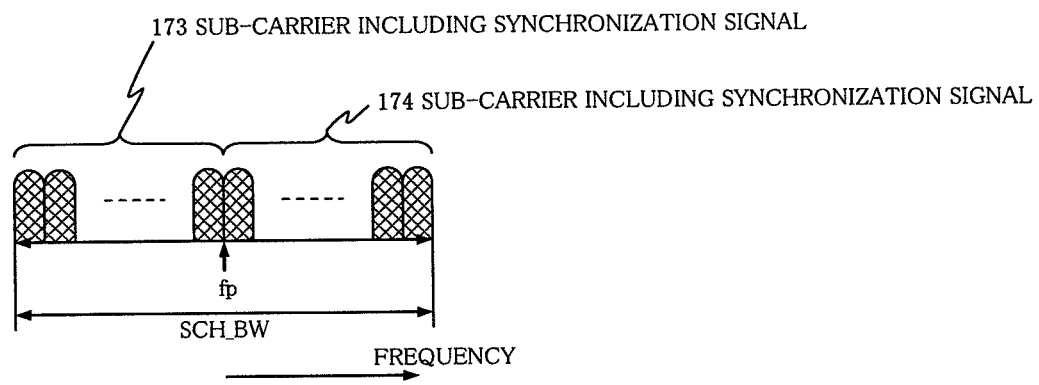
FIG. 15 A diagram schematizing sub-carriers on a frequency axis during transmission of a synchronization signal in a system which need not provide a DC sub-carrier.

FIG. 15 is a diagram which schematizes sub-carriers on a frequency axis during transmission of a synchronization signal in a system which is not required to provide a DC sub-carrier.

As shown in FIG. 15, the synchronization signal is comprised of sub-carriers 173, 174 which include the synchronization signal. Then, center frequency fp of the synchronization signal is set such that it resides at a frequency between sub-carrier 173 which includes the synchronization signal and sub-carrier 174 which includes the synchronization signal.

Figure 16:
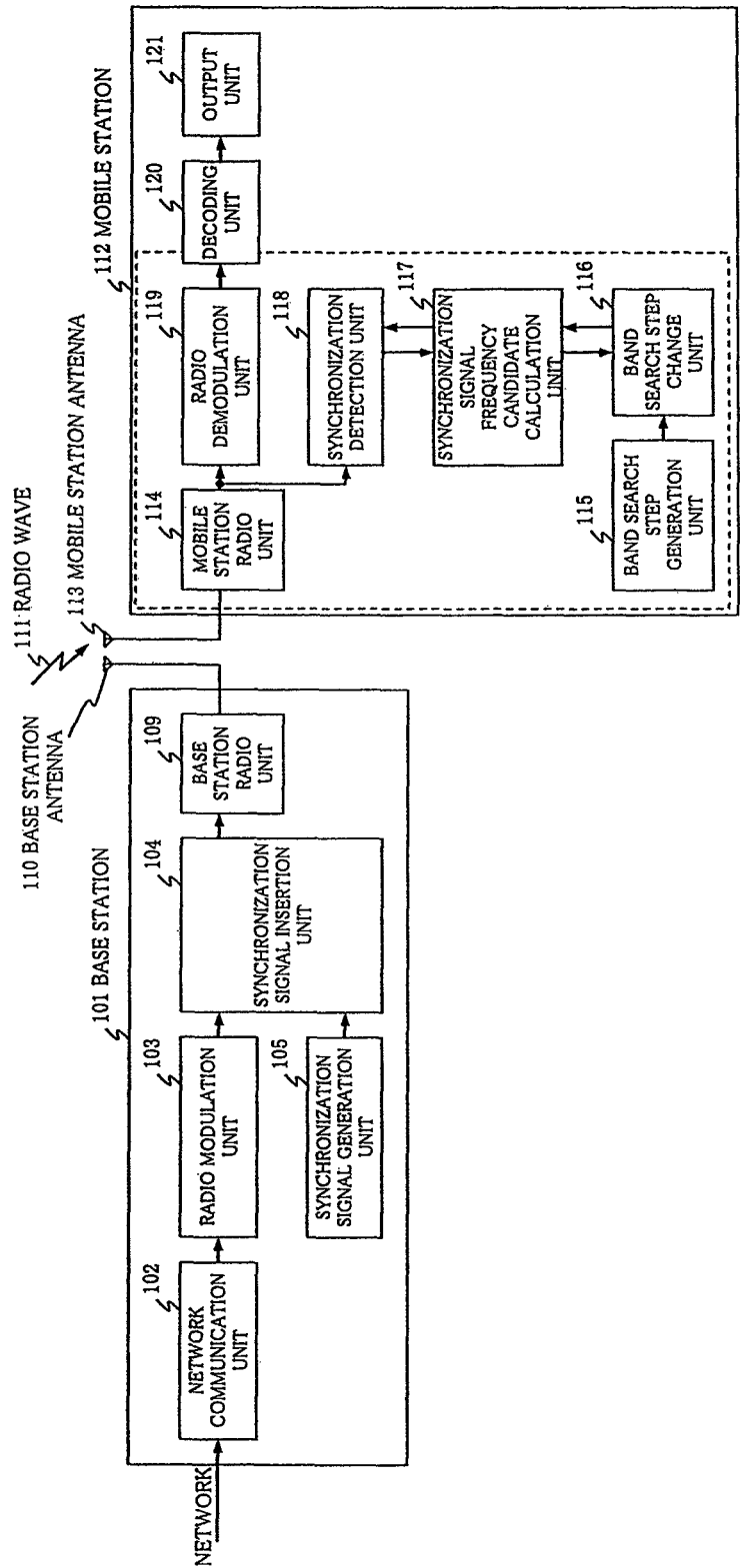
FIG. 16 A diagram showing a form of a communication system according to the present invention when it is applied to a radio communication system which employs a radio communication scheme.

FIG. 16 is a diagram showing one form of a communication system according to the present invention which is applied to a radio communication system that employs a radio communication scheme.

As shown in FIG. 16, this form comprises base station 101 and mobile station 112. Radio wave 111 is transmitted/received between base station 101 and mobile station 112 to implement a communication.

Further, base station 101 comprises network communication unit 102, radio modulation unit 103, synchronization signal insertion unit 104, synchronization signal generation unit 105, base station radio unit 109, and base station antenna 110.

Mobile station 112 in turn comprises mobile station antenna 113, mobile station radio unit 114, band search step generation unit 15, band search step change unit 117, synchronization frequency candidate calculation unit 117, synchronization detection unit 118, radio demodulation unit 119, decoding unit 120, and output unit 121.

Network communication unit 102 receives a signal received from a network. Radio modulation unit 103 performs modulation, for example, IFFT (Inverse Fast Fourier Transform) or FFT (Fast Fourier Transform) to make an OFDM communication, or the like for a signal received at network communication unit 102. Synchronization signal generation unit 105 generates a signal which repeats the same pattern on the time axis and can be delay detected, or generates a synchronization signal which is a known signal which can be synchronously detected, in order to establish synchronization with mobile station 112. Synchronization signal insertion unit 104 inserts the synchronization signal generated by synchronization signal generation unit 105, centered at a frequency at which mobile station 112 can detect the synchronization signal with the largest possible band search step. Base station radio unit 109, which includes a transmitter and an amplifier, transmits an output signal of synchronization signal insertion unit 104 from base station antenna 110 as radio wave 111.

Mobile station radio unit 114, which includes a receiver and an amplifier, receives radio wave 111 transmitted from base station antenna 110 through mobile station antenna 113. Band search step generation unit 115 stores or generates a plurality of band search steps and delivers them. Band search step change unit 116 selects one band search step from the plurality of band search steps. In this event, a larger value is first selected, and then smaller values are sequentially selected at stages. Synchronization signal frequency candidate calculation unit 117 calculates a candidate frequency for the synchronization signal using a predetermined calculation equation from the band search step selected by band search step change unit 116. Synchronization detection unit 118 detects whether or not the synchronization signal exists at the candidate frequency through delay detection or synchronous detection. Radio demodulation unit 119 performs FFT or IFFT or the like for OFDM demodulation using the timing at which the synchronization is detected in synchronization detection unit 118. Decoding unit 120 decodes a signal demodulated by radio demodulation unit 119. Output unit 121 displays or audibly outputs the signal decoded by decoding unit 120 from a speaker or the like.

Here, if synchronization detection unit 118 fails to detect the synchronization, synchronization signal frequency candidate calculation unit 117 specifies a next candidate frequency from the same band search step as above in accordance with the predetermined equation, and synchronization detection unit 118 again detects the synchronization.

When candidate frequencies calculated from the same band search step no longer exist within a search band, band search step change unit 116 selects a next band search step, synchronization signal frequency candidate calculation unit 117 specifies a candidate frequency from a new band search step in accordance with the predetermined equation, and synchronization detection unit 118 again detects the synchronization.

In the form shown in FIG. 16, radio modulation unit 103 and radio demodulation unit 119 may comply with a communication system such as MC-CDMA (Multi-Carrier Code Division Multiple Access), FDMA (Frequency Division Multiple Access) and the like other than OFDM. Also, a wired communication scheme may also be employed other than the radio communication scheme.

Figure 17A:
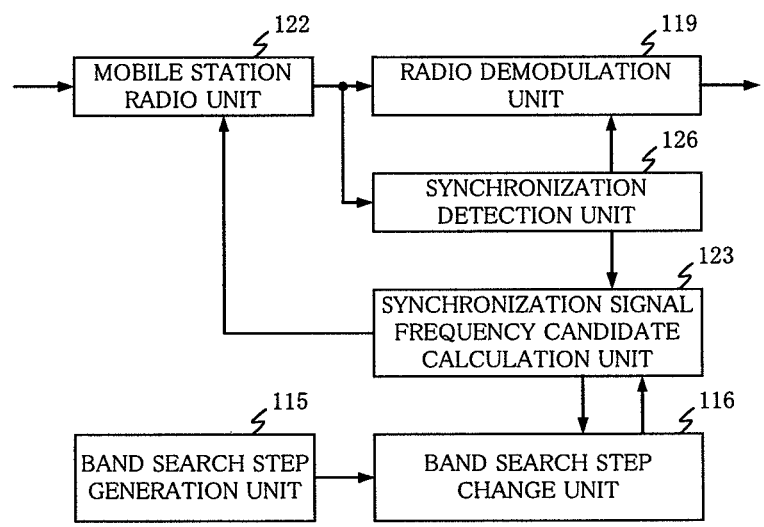
FIG. 17(a) A diagram showing a first form of a portion indicated by a broken line within the form shown in FIG. 16 when another configuration is used.
Figure 17:
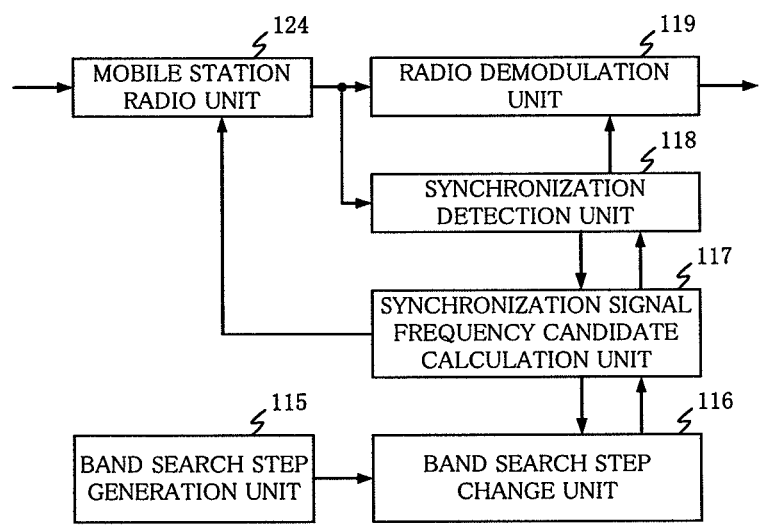
FIG. 17(b) A diagram showing a second form of the portion indicated by a broken line within the form shown in FIG. 16 when another configuration is used.

FIG. 17 is a diagram showing a form, when another configuration is employed, for a portion indicated by broken lines within the form shown in FIG. 16.

As shown in FIG. 17(*a*), this form differs from the portion indicated by broken lines within the form shown in FIG. 16 in the configuration of mobile station radio unit 122, synchronization signal frequency candidate calculation unit 123, and synchronization detection unit 126.

Synchronization signal frequency candidate calculation unit 123 controls an oscillator of mobile station radio unit 122 which comprises super-heterodyne or direct conversion, and controls the oscillator such that a synchronization signal candidate frequency is converted to a baseband frequency (=0 Hz) or a constant intermediate frequency which enters synchronization detection unit 126.

Specifically, assuming that a synchronization signal candidate frequency at an n-th stage is fpch_c(n), and a radio unit frequency specified through down-conversion in mobile station radio unit 122 at this timing n is fradio(n), fpch_c(n) is defined as shown in Equation 23. In this event, however, no consideration is given to the delay of data from mobile station radio unit 122 to synchronization detection unit 126.

[Expression 23]

$$f_{pch\_c}(n) = f_{radio}(n) \quad \text{(EQUATION 23)}$$

Also, relationships with function f(k,Ntmp) shown in FIGS. 7(*a*)-(*d*) are represented by Equation 24, Equation 25, Equation 26, and Equation 27.

[Expression 24]

$$f_{pch\_c}(0) = f(0,0) \quad \text{(EQUATION 24)}$$

[Expression 25]

$$f_{pch\_c}(1) = f(0,1) \quad \text{(EQUATION 25)}$$

[Expression 26]

$$f_{pch\_c}(2) = f(1,0) \quad \text{(EQUATION 26)}$$

[Expression 27]

$$f_{pch\_c}(3) = f(1,2) \quad \text{(EQUATION 27)}$$

Accordingly, a signal centered at fpch_c(n) is applied to synchronization detection unit 126 as is the case with f(k, Ntmp). Synchronization detection unit 126 detects the synchronization centered at the same 0 Hz or intermediate frequency at all times.

Also, as shown in FIG. 17(*b*), this form differs from the portion indicated by broken lines within the form shown in FIG. 16 in the configuration of mobile station radio unit 124.

In mobile station radio unit 124, assuming that a radio unit frequency specified through down-conversion of a frequency at timing n is fradio(n), and that a digital frequency digitally specified by synchronization detection unit 118 is fdig(n), the relationship between them is as represented by Equation 28. In this event, however, no consideration is given to the delay of data from mobile station radio unit 124 to synchronization detection unit 118.

$$f_{pch\_c}(n) = f_{radio}(n) + f_{dig}(n) \quad \text{(EQUATION 28)}$$

Due to the fact that radio unit frequency fradio(n) specified for mobile station radio unit 124 is analog, a long time is required for stability of frequency if radio unit frequency fradio(n) is changed, so that frequent changes will require a long time.

On the other hand, the method of specifying digital frequency fdig(n) in synchronization detection unit 118 generally involves multiplying sin, cos signals by a received signal. On the other hand, when delay detection is used, it is possible to employ a method of changing a filter through which a received signal is passed. When synchronous detection is performed using a replica signal, the method detects matching by shifting and converting on the frequency axis in a conversion (IFFT, FFT) from the frequency axis to the time axis when generating the replica. The synchronous detection in this event detects matching with a known signal. Alternatively, the synchronous detection detects matching with a replica signal calculated from a known signal using IFFT, FFT or the like. Then, a plurality of replica signals may be generated from a plurality of signals which have been shifted on the frequency axis, and the generated replica signals may be stored and used.

In this event, the storage capacity can causes a problem if a plurality of previously calculated and stored replicas are used for performance.

Accordingly, assuming that Δfdig designates a range which can be supported by changing a digital frequency alone, when calculated fpch_c(n) satisfies Equation 29, the synchronization detection unit alone is controlled to specify a frequency. Alternatively, when. Equation 29 is not satisfied, a method can be employed to control mobile station radio unit 124 or to control both mobile station radio unit 124 and synchronization detection unit 118 to specify a frequency.

[Expression 29]

$$f_{radio}(n-1) - f_{dig}/2 \leq f_{pch\_c}(n) \leq f_{radio}(n-1) + f_{dig}/2 \quad \text{(EQUATION 29)}$$

The invention claimed is:

1. A communication system comprising a transmission device for transmitting a synchronization signal for establishing synchronization, and a reception device for establishing synchronization by detecting the synchronization signal, wherein said reception device sequentially changes intervals from long intervals to shorter intervals at which an attempt is made to detect the synchronization signal, said transmission device is set to transmit the synchronization signal at long intervals of said reception device, said synchronization is frequency synchronization, and said establishment of synchronization includes detecting an effective communication frequency, said reception device sequentially switches a preset frequency change amount from a larger value to a smaller value in stages, calculates a reception side candidate frequency for detecting the synchronization signal based on the frequency change amount, and detects the synchronization signal using the calculated reception side candidate frequency, and said transmission device calculates a transmission side candidate frequency which is a candidate for a frequency for transmitting the synchronization signal, based on the largest possible frequency change amount calculated on the basis of a system bandwidth in which said communication system communicates, and determines the transmission side candidate frequency as a synchronization signal frequency for transmitting the synchronization signal when the transmission side candidate frequency exists within the system frequency band.

2. The communication system according to claim 1, wherein:
said reception device adds an offset to an integer multiple of the reception side frequency change amount to generate the reception side candidate frequency, and
said transmission device adds an offset to an integer multiple of the transmission side frequency change amount to generate the transmission side candidate frequency.

3. The communication system according to claim 2, wherein:
said reception device sets the offset to zero, and
said transmission device sets the offset to zero.

4. The communication system according to any one of claims 1, 2 and 3, wherein:
said transmission device transmits a known signal as the synchronization signal, and
said reception device detects matching the reception side candidate frequency with the known signal or with a replica signal calculated from the known signal using IFFT or FFT, and stores the calculated replica signal.

5. The communication system according to any one of claims 1, 2 and 3 wherein:
said transmission device transmits a signal which repeats the same pattern as the synchronization signal, and
said reception device detects the synchronization signal through a delay detection.

6. The communication system according to any one of claims 1, 2 and 3, wherein:
said transmission device sets the transmission side frequency change amount to an integer multiple of a minimum placement of a center frequency of the system band.

7. The communication system according to any one of claims 1, 2 and 3 wherein:
said reception device sets the reception side frequency change amount to an integer multiple of a minimum placement unit of a center frequency of the system band.

8. A transmission device for transmitting a synchronization signal to a reception device for establishing synchronization within a system frequency band, wherein:
said transmission device calculates a transmission side candidate frequency which is a candidate for a frequency for transmitting the synchronization signal based on a largest possible transmission side frequency change amount calculated on the basis of a bandwidth of the synchronization signal, and determines the transmission side candidate frequency as a synchronization signal frequency for transmitting the synchronization signal when the transmission side candidate frequency exists within the system frequency band.

9. The transmission device according to claim 8, further comprising:
adding an offset to an integer multiple of the transmission side frequency change amount to generate the transmission side candidate frequency.

10. The transmission device according to claim 9, further comprising:
setting the offset to zero.

11. A reception device for receiving a synchronization signal transmitted from a transmission device, wherein:
said reception device sequentially switches a preset reception side frequency change amount from a larger value to a smaller value in stages, calculates a reception side candidate frequency for detecting the synchronization signal based on the reception side frequency change amount, and detects the synchronization signal using the calculated reception side candidate frequency.

12. The reception device according to claim 11, further comprising:
adding an offset to an integer multiple of the reception side frequency change amount to generate the reception side candidate frequency.

13. The reception device according to claim 12, further comprising:
setting the offset to zero.

14. A synchronization method in a communication system comprising a transmission device for transmitting a synchronization signal for establishing synchronization within a system frequency band, and a reception device for detecting the synchronization signal within the system frequency band, said method comprising:
processing performed by said reception device to sequentially change intervals from long intervals to shorter intervals at which an attempt is made to detect the synchronization signal;
processing performed by said transmission device to set a transmission such that the synchronization signal is detected at the long intervals of said reception device;
processing performed by said reception device to sequentially switch a preset frequency change amount from a larger value to a smaller value in stages;
processing performed by said reception device to calculate a reception side candidate frequency for detecting the synchronization signal based on the reception side frequency change amount;
processing performed by said reception device to detect the synchronization signal using the calculated reception side candidate frequency;
processing performed by said transmission device to calculate a transmission side candidate frequency which is a candidate for a frequency for transmitting the synchronization signal, based on the largest possible frequency change amount calculated on the basis of a bandwidth of the synchronization signal;
processing performed by said transmission device to determine the transmission side candidate frequency as a synchronization signal frequency for transmitting the synchronization signal when the transmission side candidate frequency exists within the system frequency band; and
processing performed by said transmission device to transmit the synchronization signal to said reception device using the synchronization signal frequency.

* * * * *